United States Patent [19]

Robinson

[11] 4,030,877

[45] June 21, 1977

[54] FURNACE WASTE GAS HEAT RECOVERY DEVICE AND METHOD OF USING SAME

[76] Inventor: Philip W. Robinson, 7831 Seventh St., Downey, Calif. 90241

[22] Filed: Nov. 26, 1975

[21] Appl. No.: 635,342

[52] U.S. Cl. .................................. 432/29; 432/62; 432/223
[51] Int. Cl.² .................... F24H 7/02; F24J 3/00; F24H 1/00
[58] Field of Search ................ 432/29, 30, 62, 223

[56] References Cited

UNITED STATES PATENTS

| | | | |
|---|---|---|---|
| 2,223,572 | 12/1940 | Noack et al. | 432/29 |
| 2,729,301 | 1/1956 | Ekstrom, Jr. | 432/29 |

Primary Examiner—John J. Camby
Attorney, Agent, or Firm—William C. Babcock

[57] ABSTRACT

A waste gas heat recovery device and method of using the same, which device may be interposed between a stack and associated to use the waste heat and minimize the heat energy required in operating the furnace. The device may also be used with any type furnace or heat emitting device in which heated waste gas and air for combustion of fuel are discharged through the waste gas flues alternately.

8 Claims, 2 Drawing Figures

FURNACE WASTE GAS HEAT RECOVERY DEVICE AND METHOD OF USING SAME

BACKGROUND OF THE INVENTION

1. Field of the Invention

Furnace waste gas heat recovery device and method of using same.

2. Description of the Prior Art

In the past operation of glass furnaces and the like, little or no effort has been made to recover heat from the waste gases of combustion. However, with the recent drastic increase in the cost of fuel, particularly gas and oil, it is highly desirable that heat in waste gases be utilized to the maximum extent possible to minimize the quantity of fuel required to operate the furnace. Minimizing fuel requirements for operation of a furnace is not only desirable from an economics standpoint, but also in the national interest to conserve fuel.

SUMMARY OF THE INVENTION

The waste gas heat recovery device as illustrated includes a valve box having a pivotally movable first valve plate therein. The valve box is in communication with first, second and third conduits. First and second conduits may alternately have hot gases from the furnace and air for combustion of the fuel discharged therethrough. The third conduit extends to a stack. The third conduit has a second movable valve plate therein to control the volume of hot waste gases from the furnace that flow to the stack.

The duct extends upwardly to a heat exchanger, which heat exchanger has a number of first passages therein that are defined by a heat conducting material. The passages are in communication with a fourth conduit that has a draft inducing fan associated therewith. The when operating, draws hot gases from the furnace through the first passages and discharges the gases to the ambient atmosphere. The first passages may be defined either by separate tubes or a cellular arrangement such as in a radiator.

The invention is illustrated as including a fifth conduit which is in communication with a number of second passages in the interior of the heat exchanger. The fifth conduit extends to a combustion chamber. The combustion chamber heats air flowing therethrough to increase the pressure of the heated air to expand the same, with the hot compressed air being discharged to a turbine that has a drive shaft. Heated air from the discharge of the turbine flows to a sixth conduit, which conduit is connected to the interior of the valve box. By manipulation of the first valve plate, the heated air discharge from the turbine may be directed through either the first or second conduit and thereafter utilized to support the combustion of fuel used in heating the furnace.

The drive shaft of the turbine rotates a blower. Air is discharged under pressure from the blower through a seventh conduit to enter the second passages in the heat exchanger and be heated by the hot waste gases flowing through the first passages. A tubular lateral take-off is secured to the seventh conduit. By opening a valve in the tubular take-off pressurized air may be directed therethrough to operate bottle making machines, or the like. The second valve plate permits a desired quantity of the heated waste gases from the furnace to be discharged through the heat recovery device. When the second valve plate is in the fully open position, the heat recovery device is inoperative and all the heated waste gas from the furnace flow to the stack.

In non-reversing furnaces, the heated waste gases from the furnace may flow directly to the heat exchanger; dispensing with the receiving valve.

DESCRIPTION OF THE PREFERRED EMBODIMENT

Figure 1:
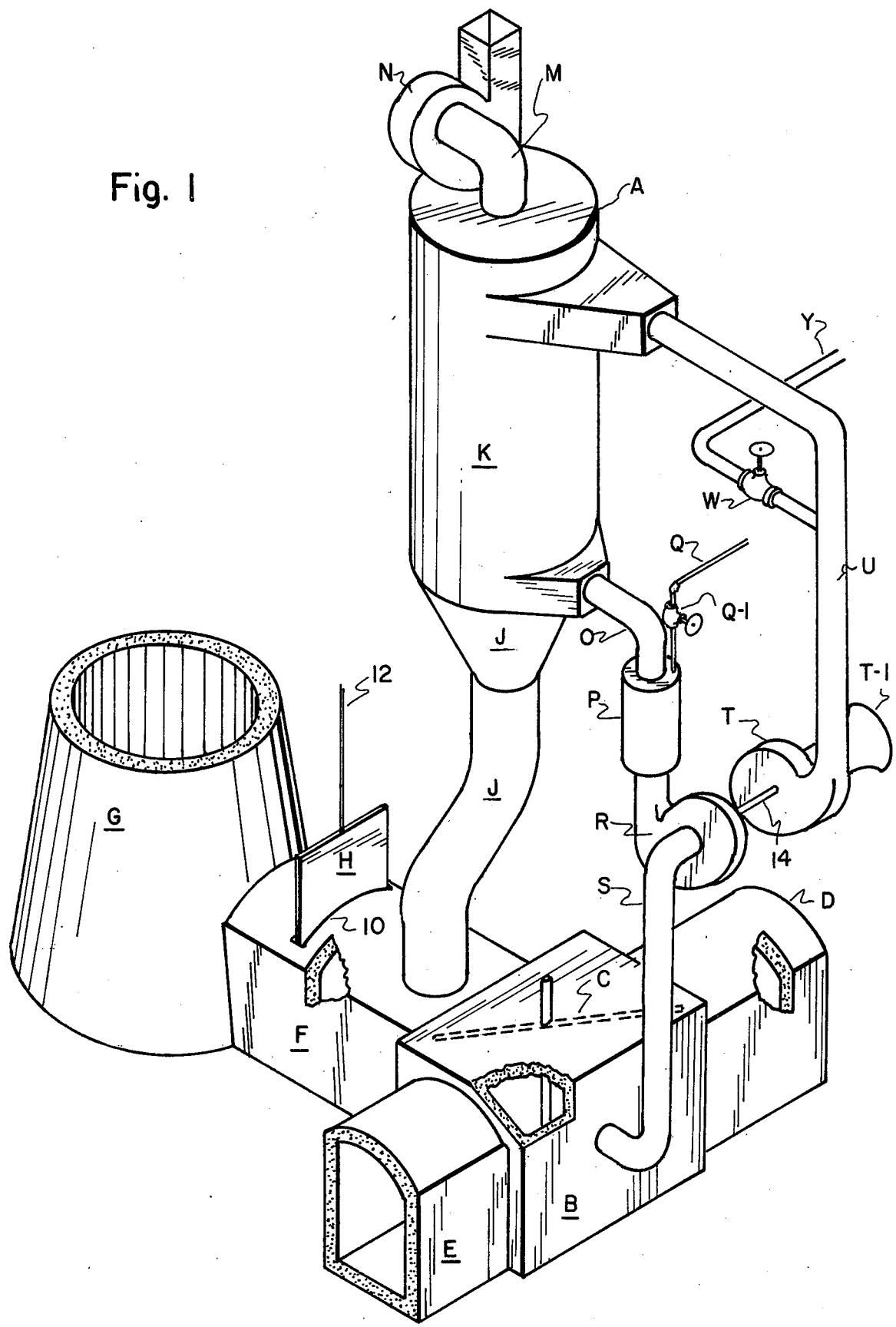
FIG. 1 is a perspective view of the furnace waste gas heat recovery device and associated equipment.

The furnace waste gas heat recovering device A, as may be seen in FIG. 1, includes a valve box B in which a first valve plate C may be moved to either a first or second diagonal position. The interior of valve box B is in communication with first, second and third conduits D, E and F, respectively. The box B, first valve plate C and first, second and third conduits D, E and F are formed from a heat resisting rigid material. The first and second conduits D and E are illustrated in FIG. 1 as being axially aligned. The third conduit F is normally disposed relative to the first and second conduits D and E.

Third conduit F is in communication with a stack G, a portion of which is shown in FIG. 1. A transverse slot 10 is formed in the upper portion of the third conduit F. A second valve plate H is vertically movable in slot 10 by use of a rod 12 or other control device. The position of the second valve plate H controls the quantity of hot waste gas that flows to the stack G.

A duct J extends upwardly from the third conduit F and is in communication with first passage defining means L located within the interior of a heat exchanger K. The first passage defining means L are in communication with a fourth conduit M that extends upwardly from heat exchanger K to a power driven draft inducing fan N.

A fifth conduit O is in communication with the lower interior portion of heat exchanger K, and the fifth conduit O extending to the inlet of a combustion chamber P. The combustion chamber P is supplied fuel through a pipe Q, which pipe has a control valve Q-1 therein. Turbine R has a drive shaft 14 that powers a blower T. Turbine R is supplied hot pressurized air from combustion chamber P. If desired, the turbine R, drive shaft 14 and blower T may be an integral unit.

The hot air discharges from turbine R through a sixth conduit S to the interior of the valve box B, or by conventional piping (not shown) may be recycled to the duct J to flow through heat exchanger K. Blower T has a seventh conduit U extending from the discharge thereof to the interior of heat exchanger K, and an air inlet T-1 that is in communication with the ambient atmosphere. Seventh conduit U has a tubular take-off V extending outwardly therefrom through which air under pressure may discharge to operate bottle making machines, or the like, (not shown). Flow of air through take-off V is controlled by a valve W.

Figure 2:
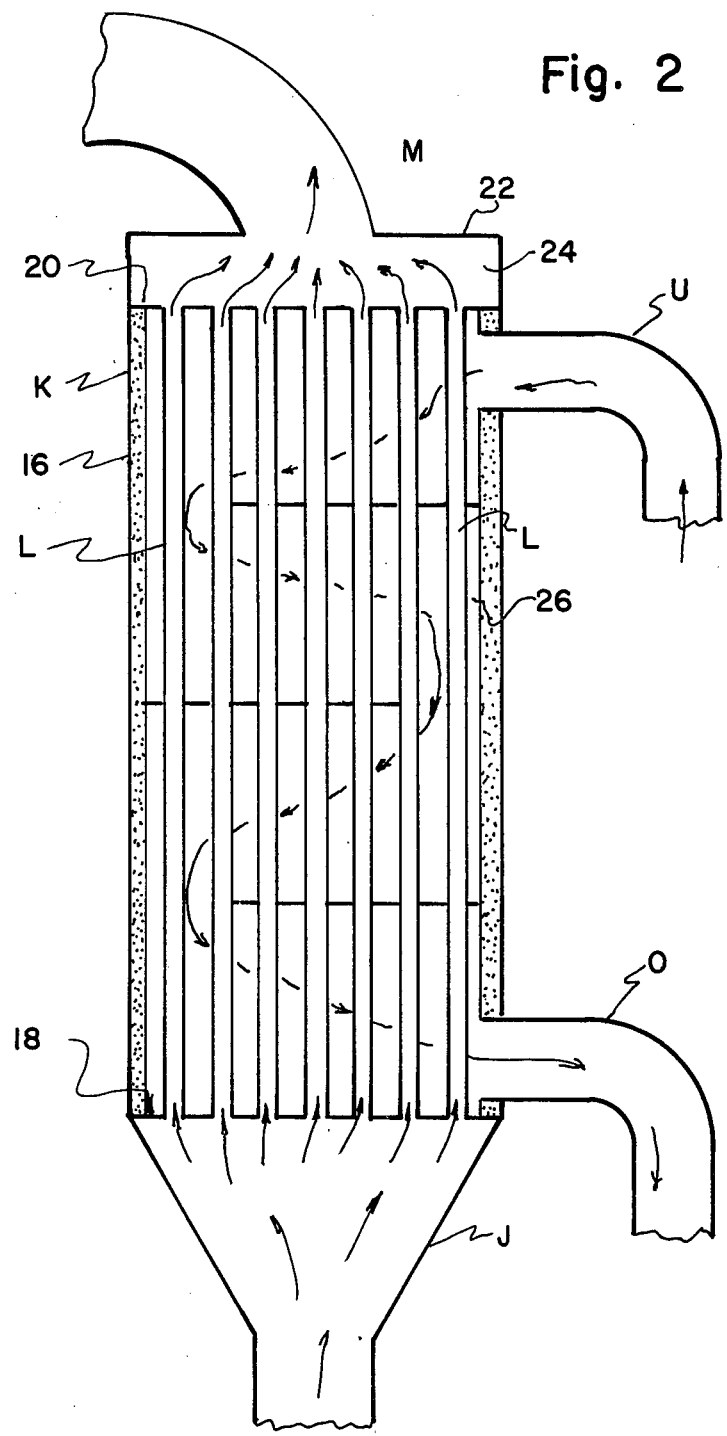
FIG. 2 is a vertical cross-sectional view of the heat exchanger.

Heat exchanger K may be of any desired structure, but is illustrated as including a cylindrical shell 16 that has an apertured bottom 18 from which the tubes L extend upwardly to an apertured partition 20. The lower end of heat exchanger K is connected to duct J as shown in FIG. 2.

The upper end of shell 16 is closed by an end piece 22 that has an opening therein in communication with fourth conduit M. The partition 20 cooperates with end piece 22 to define a first compartment 24 into which hot gases flowing upwardly in tubes L enter. The hot gases flow from first compartment 24 to fourth conduiit M.

Air flows through seventh conduit U into a second compartment 26 that is defined between partition 20 and bottom 18, and through which second compartment the tubes L extend. Air is discharged by blower T through seventh conduit U into second compartment 26 at a substantial pressure, and is heated at this pressure to further expand and flow through fifth conduit O to combustion chamber P. The heated pressurized air is further heated and further expanded in combustion chamber P to be thereafter discharged to turbine R to power the latter.

The air discharged from turbine R has a substantial heat content and flows through sixth conduit S to the valve box B. In FIG. 1 it will be seen that this heated air will be directed through second conduit E where it will be used to support combustion of the fuel used to heat the furnace, (not shown). By rotating the valve plate C ninety degrees to a second position, the hot air previously mentioned may be directed into the first conduit D, and the second conduit E having hot gases from the furnace (not shown) directed therethrough.

The use and operation of the waste gas heat recovery device A is as follows: the first and second conduits D and E are placed in communication with a conventional end port or side port glass furnace, open hearth furnace, or other heat emitting device (not shown), in such a manner that heated gases from the furnace may be alternately discharged into the first and second conduits for desired time intervals, or continuously as required by the furnace. When heated waste gases from the furnace discharge through one of the first or second conduits D and E, the other conduit is used to conduct heated air to the furnace to support the combustion of the fuel used in heating the furnace.

When heated waste gases from the furnace discharge through the first conduit D, the gases enter the valve box B, and are directed to the third conduit F when the first valve plate C is in the first position as illustrated in FIG. 1. Heated waste gases flowing through the second conduit E may likewise be diverted to the third conduit F by pivoting the first valve plate C 90° to a second position.

Heated waste gases flow through the third conduit F to the stack G. By raising and lowering the second valve plate H, a desired quantity of the heated waste gases flowing through third conduit F, may be directed upwardly through the duct J to enter heat exchanger K. The heated waste gases, upon entering heat exchanger K, flow through the first passage defining means L to enter the first compartment 24, and exhaust through fourth conduit M due to operation of the draft inducing fan N.

Blower T discharges air from the ambient atmosphere through the seventh conduit into the second compartment 26 at a substantial pressure. The pressurized air in second compartment 26 is heated by the waste furnace gases flowing upwardly through the first passage defining means in heat exchanger K, which means are illustrated as being tubes. Pressurized heated air from second compartment 26 flows outwardly from the lower portion thereof through fifth conduit O to a combustion chamber P where it is further heated.

Heated air at an increased pressure discharges from the combustion chamber P into turbine R to drive the latter, with heated air discharging from the turbine through a sixth conduit to valve box B, to flow to the furnace or heat emitting device (not shown) through either the first or second conduits D or E. The heated air flowing through either the first or second conduits D or E is used to support the combustion of fuel used in heating the furnace. Turbine R, as it rotates, drives blower T by shaft 14 shown in FIG. 1.

When second valve plate H is in the uppermost position, all waste gases from the furnace (not shown) flow directly to stack G. Likewise, when second valve plate H is in the lowermost position, all waste furnace gases would flow through the heat recovery device A, and maximum heat would be recovered from the gases. In FIG. 1 it will be seen that pressurized air may be bled from seventh conduit U through the tubular take-off line Y. Pressurized air flowing through take-off line Y may be used in the operation of the bottle making machines (not shown), and the like. Take-off line Y includes a valve W.

In those instances where the heat content of the waste gases is sufficient, the combustion chamber P may be eliminated, and the air used in driving the turbine R being heated and pressurized by the joint operation of the blower T and heat exchanger E. Since the discharge of the turbine is heated air feeding it to the furnace rather than ambient atmosphere will save a considerable amount of fuel.

The waste gas heat recovery device A may be used with any type of furnace or heat emitting device, but is illustrated in the drawings as including first and second conduits D and E through which hot gases from a furnace or heat emitting device (not shown) are discharged. No attempt has been made to describe the control and regulation of the various elements as this is equipment being used at present in the industry.

The use and operation of this invention has been explained previously in detail, and further description thereof is not considered necessary.

I claim:

1. In combination with a fuel fired device that emits hot waste gases the flow therefrom to a stack and which device required air to support the combustion of fuel used in heating said device, a waste gas heat recovery unit, said unit including:

a. a valve box assembly that has first, second and third conduits extending therefrom, said first and second conduits in communication with said furnace, said third conduit in communication with said stack, a first valve plate in said assembly capable of selectively occupying first and second positions, said valve plate when in said first position permitting hot waste gases to flow through said first conduit to said their conduit and air to flow through said second conduit to said furnace to support combustion of said fuel, said first valve plate when in a second position permitting hot waste gases to flow from said furnace through said second conduit to said third conduit and air to flow through said first conduit to said furnace to support the combustion of said fuel, a second movable valve plate in said third conduit to control the volume of said heated waste gases flowing to said stack, and a duct in communication with the interior of said third conduit at a position intermediate said first and second valve plates;

b. a heat exchanger that includes a continuous sidewall, a top, a bottom, and a partition intermediate said top and bottom, said partition dividing the interior of said heat exchanger into first and second compartments, a plurality of heat conducting tubes in said second compartment that are each in sealing engagement with an aperture in said bottom and an aperture in said partition, with said heat exchanger having said apertures in said bottom in communication with the interior of said duct;

c. a fourth conduit in communication with said first compartment;

d. a power driven draft inducing fan connected to said fourth conduit to draw said hot waste gases through said heat conducting tubes, first compartment and fourth conduit and discharge said hot waste gases to the ambient atmosphere;

e. a fifth conduit in communication with said second compartment;

f. a gas turbine having an inlet and outlet and a drive shaft;

g. first means in communication with said fifth conduit and said inlet for heating air flowing through said fifth conduit prior to said air entering said inlet;

h. a sixth conduit extending from said outlet to, said valve box assembly, said sixth conduit having heated air discharging therethrough after said heated air has flowed through said turbine, with said heated air after entering said valve box assembly flowing through either said first or second conduit depending on whether said first valve plate occupies a first or second position, and said heated air supporting combustion of fuel used in heating said furnace;

i. a blower driven by said shaft, said blower having an inlet in communication with the ambient atmosphere, and an outlet through which air at a substantial pressure is discharged; and j. a seventh conduit that connects said blower outlet to said second compartment for air under said substantial pressure to be heated by said plurality of tubes as it flows through said second compartment and prior to said air at substantial pressure flowing through said fifth conduit to said first means to be further heated and further pressurized prior to entering said turbine inlet to drive said turbine.

2. A waste gas heat device as defined in claim 1 in which said first means is a fuel fired combustion chamber.

3. A waste gas heat recovery device as defined in claim 1 which in addition includes:

k. a tubular take-off line in communication with said seventh conduit through which pressurized air may flow; and e. a valve in said take-off line to control the flow of pressurized air therethrough 4. In combination with a fuel fired device that emits hot waste gases the flow therefrom to a stack, and which device requires air to support the combustion of fuel used in heating said device, a waste gas heat recovery unit, said unit including:

a. a heat exchanger that has a plurality of first and second non-communicating passages therein;

b. first means intermediately disposed between said stack and device for diverting at least a portion of said hot waste gases to said first passage;

c. second means for drawing said hot waste gases through said first passages and discharging the same to the ambient atmosphere;

d. a gas turbine in communication with said second passages, said turbine including a drive shaft;

e. a blower driven by said drive shaft, said blower including an inlet and an outlet, said inlet in communication with the ambient atmosphere, said outlet in communication with said second passages, with said blower as it operates discharging air at a substantial pressure into said second passages to be heated by heat from said first passages, and said air as it is heated in said second passages tending to expand and reaching a pressure sufficient to drive said gas turbine; and f. third means for conducting hot air discharged from said turbine to mix with said fuel prior to the latter burning to heat said device.

5. A unit as defined in claim 4 which in addition includes:

g. fourth means for further heating hot air discharging from said second passages to increase the pressure of said hot air prior to said hot air entering said gas turbine.

6. A method of recovering heat from hot waste gases that flow from a heat emitting device to a stack said device being heated by fuel mixed with air, said method including the steps of:

a. diverting at least a portion of said hot waste gases to a plurality of first passages defined by a heat conducting material;

b. drawing said hot waste gases through said first passages at a desired velocity;

c. discharging air under pressure from the ambient atmosphere into a plurality of second passages to be heated by said hot waste gases flowing through said first passages, said air discharging from said second passages at a pressure greater than that as which it entered said second passages;

d. transforming hot pressurized air discharging from said second passages into rotational power;

e. using said rotational power to pressurize air from the ambient atmosphere entering said second passages; and f. mixing said hot pressurized air after said transformation with said fuel prior to the latter burning to heat said heat emitting device.

7. The method as defined in claim 6 which includes the further step of:

g. heating air discharging from said second passages to increase the pressure thereon prior to said air being transformed to rotational power.

8. The method as defined in claim 7 in which said hot pressurized air is transformed into rotational power by directing said hot pressurized air onto a rotatable member.

* * * * *